Patented Oct. 24, 1950

2,526,938

UNITED STATES PATENT OFFICE 2,526,938

MOISTURE INDICATOR

Paul B. Davis and James N. Pryor, Baltimore, Md., assignors to The Davison Chemical Corporation, Baltimore, Md.

No Drawing. Application September 11, 1946, Serial No. 696,351

2 Claims. (Cl. 252—408)

This invention relates in general to moisture indicators and more particularly has reference to indicators which are responsive to quantitative changes.

Many chemical compounds and especially a number of salts exist in the anhydrous and hydrated states. A number of these compounds are of one color in the anhydrous state and a different color in the hydrated state and thereby are suitable for use as indicators for detecting the presence of moisture. The above-mentioned compounds, per se, are not suitable for use as quantitative indicators as is contemplated by the present invention but when supported on an adsorbent carrier, as herein described, are highly useful.

In the manufacture of certain products control of the humidity of the air or other gaseous atmosphere is important. It sometimes happens that even a fraction of a percent of relative humidity in an atmosphere may be detrimental to the operation of a process or the product resulting therefrom.

A number of indicators for quantitatively responding to the presence of moisture have been developed as described in copending applications of Paul Bell Davis, Serial Numbers 576,716, now U. S. Patent No. 2,460,065, and 576,726, now abandoned, which have proven satisfactory. In some instances, especially at very low relative humidities, it is desirable to have an indicator which after having responded to one moisture condition will respond to a different moisture condition. Also in some instances the color break is not as distinct as is desirable.

An object of this invention is to provide a moisture indicator capable of responding to positive or negative variations in moisture content.

Another object of this invention is to provide a color changing moisture indicator including a suitable dye for accentuating the color break.

A further object of this invention is to provide a moisture indicator comprising an adsorbent carrier having an inorganic color changing moisture responsive chemical adsorbed therein together with an organic dye for accentuating the color break.

It is also an object of this invention to provide a reversible color changing moisture indicator that will accurately indicate the existing condition regardless of what the previous conditions have been.

A still further object of this invention is to provide a method of making a reversible color changing moisture indicator.

In addition, the present invention has for its object a method of accentuating the color break or change in a color changing moisture indicator.

Other objects will appear more fully hereinafter.

As pointed out in the above mentioned copending applications, it has been found that by associating a compound, which has one color in the anhydrous state and a different color when combined with water, with an adsorbent, the so treated adsorbent may be employed for indicating the relative humidity of an atmosphere to which the same is exposed.

For instance, by impregnating an adsorbent such as silica gel with a solution of cobalt chloride, and drying and activating the so treated silica gel, a product is obtained having a blue color. When the blue colored silica gel is exposed to a humid atmosphere, moisture from the atmosphere is adsorbed by the silica gel and as the water content of the gel is increased, the color of the gel gradually changes to pink. The change in color is due to water combining with the anhydrous cobalt chloride in the pores of the gel.

In accordance with the present invention, an adsorbent carrier is impregnated with a composition which will change color when in equilibrium with gaseous atmospheres of different relative humidities between 0 and 5% regardless of the previous condition to which the same was exposed. A moisture indicator embodying the feature of the present invention was made by providing, as a carrier, a silica gel of 6–16 mesh which was washed in the hydrogel stage with water at a temperature of 150° F. and activated at a temperature of 850° F. This carrier was then impregnated with a chromatic chemical in solution and dried.

A chromatic chemical suitable for the present invention is cobalt chloride admixed with zinc chloride. As indicated in copending application Serial No. 576,716 of P. B. Davis, now U. S. Patent No. 2,460,065, cobalt chloride alone is best suited for responding to atmospheres having high relative humidities. In order to modify the color change of the cobalt chloride in response to variations in moisture, zinc chloride was added.

A number of indicators were prepared by impregnating a silica carrier such as silica gel with aqueous solutions containing various concentrations of cobalt chloride and zinc chloride as follows:

17% $CoCl_2$—30% $ZnCl_2$
15.0 $CoCl_2$—30.0 $ZnCl_2$
15.0 $CoCl_2$—33.75 $ZnCl_2$
15.0 $CoCl_2$—37.5 $ZnCl_2$
12.5 $CoCl_2$—30.0 $ZnCl_2$
12.5 $CoCl_2$—25.0 $ZnCl_2$
10.0 $CoCl_2$—30.0 $ZnCl_2$
10.0 $CoCl_2$—20.0 $ZnCl_2$

Five milliliters of the solutions were used for impregnating 100 grams of gel after the latter had been saturated with water vapor. Saturation of the activated gel is necessary to avoid shattering of the gel upon contact with the solution of chromatic chemical.

After impregnation of the gel, it was dried at temperatures of about 275 to 300° F. Further activation of the so treated gel was not necessary which is a decided advantage from a manufacturing standpoint.

Although the color changes, when the so-treated gels were exposed to gaseous atmospheres within the range of 0-5% relative humidity, were satisfactory, the best color changes or breaks were obtained with the indicator prepared by impregnating the gel with a solution of 15% $CoCl_2$—30% $ZnCl_2$.

Indicators made from adsorbent silica impregnated with solutions of cobalt chloride and zinc chloride, as pointed out above, after exposure to 4% relative humidity or higher, can be reblued to a color ranging between the original color and that in equilibrium with 2% relative humidity. The color of these indicators will change so that they will have a substantially blue color when exposed to an atmosphere having a relative humidity ranging between 0 and 2%, a pink color when exposed to an atmosphere having a relative humidity ranging from 3-4% and a purple or lavender color when exposed to an atmosphere having a relative humidity ranging from 2-3%.

In many instances, the change in color of moisture indicators responsive to different ranges of moisture are substantially the same. For instance, an indicator consisting of adsorbent silica and cobalt chloride which will respond to relative humidities of 20—40—60% has color changes very similar to the color changes of the adsorbent silica impregnated with cobalt chloride and zinc chloride described above which responds to the lower relative humidities of 2—3—4%. According to the present invention, it has been found that the colors may be varied and the changes or breaks accentuated by incorporating with the indicator a dye.

A moisture indicator was made showing color changes from bluish green to an orange yellow between 0—3% relative humidity with a fairly good color change or break between 2 and 3% relative humidity. This indicator was made by impregnating saturated adsorbent silica gel with a solution containing 10% $CoCl_2$—20% $ZnCl_2$ plus 5 drops of FD&C yellow (4% solution in water and propylene glycol) per 5 ml. of solution per 100 grams of saturated gel.

Another indicator was made by impregnating saturated silica gel with a solution of 10% $CoCl_2$—10% $ZnCl_2$ plus 5 drops of the same FD&C yellow dye per 5 ml. solution per 100 grams of saturated gel. This indicator showed color changes from a bluish green to yellowish green with a good contrast between 2 and 3% relative humidity. Both of the above-mentioned indicators may have their color reverted after being exposed to relative humidities of about 3%.

A further indicator was prepared by impregnating silica gel with 10% $CoCl_2$—15% $ZnCl_2$ containing 6% FD&C #5 yellow combined in the proportion of 5 drops of the yellow dye to 5 ml. of solution. The solution was incorporated in the saturated silica gel in the proportions of 5 ml. of solution per 100 grams of saturated gel. This indicator was responsive to color changes when exposed to an atmosphere having relative humidities of 0-4%. The colors ranging from green, when exposed to an atmosphere of 0-2%, to yellowish green-greenish yellow at 2-3% relative humidity and yellow at 3-4% relative humidity.

The indicators prepared by impregnating silica gel with solutions of cobalt chloride and zinc chloride plus a yellow dye were dried at temperatures ranging from 275° F. to 300° F. It has been found that the temperature may be increased to as much as 375° F. without destroying the yellow dye.

All of the indicators prepared by incorporating a yellow dye along with the cobalt chloride and zinc chloride solution in silica gel and drying were capable of having their colors restored after being exposed to relative humidities of 5% or more. The restoration of the color corresponding to the lower end of the humidity range to which the indicator is responsive may be effected first by subjecting the indicator to a gaseous atmosphere having a relative humidity corresponding to the lower portion of the range or by exposing the indicator to a drying medium.

In other words, the color changing moisture indicator is responsive to both positive and negative changes in the humidity of a gaseous atmosphere to which it is exposed. While in describing the present invention, reference has been made to the use of silica gel as a carrier, it is also within the concept of the present invention to employ other forms of porous adsorbent silica. For instance, a porous glass may be employed. This glass is made from a glass containing from 60 to 82% $SiO_2$, 20 to 35% $B_2O_3$ and 5 to 10% alkali oxide heat treated at a temperature of 525 or 600° C. to cause the glass to be separated into two phases, one of which is rich in boric oxide and alkali oxide and is soluble in acids, and the other of which is very rich in silica and substantially insoluble in acids. By treating the so heat treated glass with an acid such as hydrochloric, nitric or sulphuric acids maintained at a temperature at or near the boiling point thereof, the acid reacts with the alkaline phase of the glass forming a number of microscopic pores throughout the body thereof.

Both silica gel and porous glass are substantially colorless and readily assume the color of the chromatic chemical in changing in response to variations in relative humidity.

While reference has been made to yellow dye for use in shifting or accentuating the color changes in moisture indicators, it is, of course, within the concept of the present invention to employ other colored dyes. For instance, indicating gels have been made employing FD&C #1 orange, FD&C #1 yellow, FD&C #3 green, FD&C #1 red, FD&C #6 yellow, as well as the FD&C #5 yellow.

All of these dyes are described on page 593 of Merck Index, 5th edition.

FD&C Green #3; Fast Green FCF: Di-sodium salt of 4-{[4-(N-ethyl - p - sulfobenzylamino) - phenyl]-(4-hydroxy-2-sulfoniumphenyl) - methylene}-[1 - N-ethyl-N-p-sulfobenzyl]-$\Delta^{2,5}$- cyclohexadienimine]. Soluble in water. Pure dye not less than 85.0%.

FD&C Orange #1; Orange I; Mono-sodium salt of 4-p-sulfophenylazo-1-naphthol. Soluble in water. Pure dye not less than 85.0%.

FD&C Red #1; Ponceau 3R; Disodium salt of 1 - pseudocumylazo-2 - naphthol-3,6-disulfonic acid. Soluble in water. Pure dye not less than 85.0%.

FD&C Yellow #1; Naphthol Yellow S; Disodium salt of 2,4-dinitro-1-naphthol-7-sulfonic acid. Soluble in water. Pure dye not less than 85.0%.

FD&C Yellow #5; Tartrazine; Trisodium salt of 3-carboxy-5-hydroxy-1-p-sulfophenyl-4-p-sulfophenylazopyrazole. Soluble in water. Pure dye not less than 85.0%.

FD&C Yellow #6; Sunset Yellow FCF; Disodium salt of 1-p-sulfophenylazo-2-naphthol-6-sulfonic acid. Soluble in water. Pure dye not less than 85.0%.

In addition to employing organic dyes, as hereinbefore mentioned, for the accentuating of the color break in moisture indicators responsive to low relative humidities, it is also within the concept of the present invention to employ these dyes in conjunction with moisture indicators responsive to higher relative humidities. For instance, by adding FD&C #1 red to a silica gel impregnated with cobalt chloride alone, there is a definite increase in the color contrast between the colors corresponding to relative humidities between 20% and 40% both after heat treatment of the gel at 275° F. and at 375° F.

From the foregoing, it will be appreciated that the present invention provides a moisture indicator which is reversible in that after being exposed to the higher of the relative humidity ranges to which it is responsive, it may be subjected to a gaseous atmosphere having a relative humidity at the lower end of the range to which the indicator is responsive and the color will revert back to the color of the original indicator. In addition, the present invention provides for accentuating or increasing the contrast in the colors of indicators, the color of which varies with changes in relative humidity of an atmosphere to which they are exposed.

We claim:

1. A method of preparing a moisture indicator responsive to changes in the relative humidity of a gaseous atmosphere between 0 and 5% comprising impregnating an adsorbent silica with a solution of a mixture of cobalt chloride and zinc chloride as major constituents in the proportions of 5 ml. of solution per 100 grams of saturated silica, the concentration of the cobalt chloride in the solution being 15% and the concentration of the zinc chloride in the solution being 30%, and drying the so-treated silica.

2. A method of preparing a moisture indicator responsive to changes in the relative humidity of a gaseous atmosphere between 0 and 5% comprising impregnating an adsorbent silica with a solution of a mixture of cobalt chloride and zinc chloride as major constituents in the proportions of 5 ml. of solution per 100 grams of saturated silica, the solution containing about 10% $CoCl_2$—15% $ZnCl_2$ and a few drops of tartrazine, and drying the so-treated silica at a temperature of from 275° to 375° F.

PAUL B. DAVIS.
JAMES N. PRYOR.

REFERENCES CITED

The following references are of record in the file of this patent:

UNITED STATES PATENTS

| Number | Name | Date |
| --- | --- | --- |
| 1,866,560 | Gordon et al. | July 12, 1932 |
| 2,057,938 | Crawford | Oct. 20, 1936 |
| 2,196,021 | Merrill | Apr. 2, 1940 |
| 2,214,354 | Snelling | Sept. 10, 1940 |

FOREIGN PATENTS

| Number | Country | Date |
| --- | --- | --- |
| 11,861 | Great Britain | 1914 |
| 280,934 | Great Britain | Feb. 18, 1929 |
| 393,094 | Great Britain | June 1, 1933 |